United States Patent
Bertoglio et al.

(10) Patent No.: US 11,301,937 B1
(45) Date of Patent: Apr. 12, 2022

(54) DYNAMIC GRAPHICAL USER INTERFACE (GUI) FOR CUSTOM SOFTWARE RULE CREATION AND MANAGEMENT

(71) Applicant: Avalara, Inc., Seattle, WA (US)

(72) Inventors: Mark D. Bertoglio, Seattle, WA (US); Naveen Kumar Agrawal, Bellevue, WA (US); Aaron David Wilson, Kenmore, WA (US); Marshal Kushniruk, Bainbridge Island, WA (US); Phillip Tsui, Mercer Island, WA (US); Daniel Allen Forsch, Seattle, WA (US); Indira Perdomo Cabrera, Redmond, WA (US)

(73) Assignee: Avalara, Inc., Seattle, WA (US)

( * ) Notice: Subject to any disclaimer, the term of this patent is extended or adjusted under 35 U.S.C. 154(b) by 205 days.

(21) Appl. No.: 16/709,870

(22) Filed: Dec. 10, 2019

Related U.S. Application Data

(60) Provisional application No. 62/861,660, filed on Jun. 14, 2019.

(51) Int. Cl.
  *G06Q 40/00* (2012.01)
  *G06F 9/54* (2006.01)
  *G06F 16/901* (2019.01)

(52) U.S. Cl.
  CPC ............ *G06Q 40/10* (2013.01); *G06F 9/54* (2013.01); *G06F 16/901* (2019.01)

(58) Field of Classification Search
  CPC ...... G06Q 40/12; G06Q 40/123; G06Q 10/08; G06Q 10/087; G06K 2017/0051
  USPC ............................................. 705/28, 30, 31
  See application file for complete search history.

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |
| 8,130,952 B2 * | 3/2012 | Shamoon | H04N 21/2541 380/201 |
| 8,620,578 B1 | 12/2013 | Brown et al. | |
| 8,626,803 B2 * | 1/2014 | Hsu | G06F 16/972 707/807 |
| 8,725,407 B2 | 5/2014 | Hurley et al. | |
| 8,898,100 B2 * | 11/2014 | Grechanik | G06N 5/025 706/48 |
| 9,760,915 B2 | 9/2017 | Pavlou et al. | |
| 10,007,701 B2 * | 6/2018 | Subramanian | G06F 16/00 |
| 10,375,093 B1 * | 8/2019 | Higbee | H04L 63/1483 |
| 10,445,818 B1 | 10/2019 | Chowdhary | |
| 10,552,917 B1 * | 2/2020 | Kunz | G06Q 40/12 |
| 10,628,893 B1 * | 4/2020 | Vogel | G06Q 20/22 |
| 10,769,611 B2 | 9/2020 | McNeel | |
| 10,943,026 B2 * | 3/2021 | Scuderi | G06F 16/24573 |
| 10,977,097 B2 * | 4/2021 | Patton | G06F 9/542 |
| 2002/0138765 A1 | 9/2002 | Fishman et al. | |
| 2007/0136158 A1 | 6/2007 | Rawlings et al. | |
| 2007/0136159 A1 | 6/2007 | Rawlings et al. | |
| 2013/0013471 A1 | 1/2013 | Fishman | |

(Continued)

*Primary Examiner* — Andrew Joseph Rudy
(74) *Attorney, Agent, or Firm* — Seed IP Law Group LLP

(57) ABSTRACT

Some embodiments of the present disclosure may relate generally to a dynamic graphical user interface (GUI) architecture that helps provide a user-friendly and flexible capability for software users to create and manage software application rules. These rules may help with processing by a software service or software platform. Other embodiments may be disclosed and/or claimed.

20 Claims, 21 Drawing Sheets

(56) References Cited

U.S. PATENT DOCUMENTS

2014/0122377 A1\* 5/2014 Goodman .............. G06Q 30/02
 706/11
2017/0300656 A1\* 10/2017 Cox ....................... G16H 50/20

\* cited by examiner

500

CUSTOM RULES | TEST-NAVEEN INC Switch company

New advanced transaction rule

NAME*

What would you like to create?

505

RULE TYPE*
Select One

EFFECTIVE*         EXPIRATION
08/02/2019

Do you want this rule to be active?

☑ Yes, apply it to transactions as they come into AvaTax (Save advanced transaction rule)   Cancel

Default country
Transactions use this country, unless otherwise specified
COUNTRY
[ United States of America ▼ ]

Default currency
Transactions use this currency, unless otherwise specified
CURRENCY
[ USD ]

Custom rules
Create rules to modify tax rates and transactions. Not generally recommended — 605
Manage tax rules  |⟨ Manage advanced transaction rules ⟩|  Manage custom tax codes

[ Save settings ]  Cancel

FIGURE 6

CUSTOM RULES | TEST-NAVEEN INCSwitch company o Need help with this?

Advanced rules

Create custom rules for modifying your transactions as they come into AvaTax

[Tax rules |: Advanced rules 4 :]

[+] Add an advanced rule ~701

All Active Inactive 4 advanced tax rules

| RULE NAME | RULE TYPE | EFFECTIVE | EXPIRATION | STATUS | |
|---|---|---|---|---|---|
| MatchAndUpdate | MatchAndUpdate | 04/24/2019 | 01/01/2099 | Active | Details |
| Marketplace | Marketplace | 04/26/2019 | 01/01/2099 | Active | Details |
| MatchAndUpdate | MatchAndUpdate | 06/07/2019 | 01/01/0001 | Active | Details |
| Domestic Reverse Charge FR | MatchAndUpdate | 06/12/2019 | 01/01/2099 | Active | Details |

( Back to settings )

FIGURE 7A

Marketplace rule

Rule set ⬚ Delete rule set

WHEN
All of the following are true

| FIELD | | VALUE | |
|---|---|---|---|
| ItemCode ▾ | starts with any of these ▾ | AMZ ✕ Delete value | ⬚ Delete criteria |
| | | AM1 ✕ Delete value | |
| | | + Add value | |
| CustomerCode ▾ | starts with any of these ▾ | AMZ ✕ Delete value | ⬚ Delete criteria |
| | | + Add value | |

+ Add criteria

THEN
Override the transaction location with this marketplace location

[　　　　　▾]

Don't see your location code? Add a marketplace location

FIGURE 7B

Marketplace rule

Rule set      ○ Delete rule set

WHEN
All of the following are true

| FIELD | | VALUE | |
|---|---|---|---|
| ItemCode | starts with any of these ▼ | AMZ | × Delete value ○ Delete criteria |
| | | AM1 | × Delete value |
| | | + Add value | |
| CustomerCode | starts with any of these ▼ | AMZ | × Delete value ○ Delete criteria |
| | | + Add value | |

+ Add criteria

THEN
Override the transaction location with this marketplace location

⌐ ‾ ‾ ‾ ¬
|         | ←--- 703      Populator function populates customer account specific locations
|_ _ _ _ _|       for this specific scenario Don't see your location code? Add a marketplace location

FIGURE 7C

Avatax Advanced Rules Adminstration

CreateAssign | QueryEnableConfig

Environment: [SBX ▾]  Account ID: [1100085935]  Company: [Test-Naveen Inc 158864 ▾]

Account: Avalara

Add new rule execution
Rule: [MatchAndUpdate ▾] [Add]
Update a document based on conditions

[Edit][Copy To][Move Up][Move Down][Delete]

| | Name | Start Date | End Date | Enabled |
|---|---|---|---|---|
| o | MatchAndUpdate | 2019-04-24T00:00:00 | 2099-01-01T00:00:00 | Yes |
| o | Marketplace | 2019-04-26T00:00:00 | 2099-01-01T00:00:00 | Yes |
| o | MatchAndUpdate | 2019-06-07T00:00:00 | 0001-01-01T00:00:00 | Yes |

FIGURE 7D

Match and Update Rule
Match and Update Rule updates a document based on conditions Match and Update Rule 1     [Delete Match and Update Rule]

When
All of the following are true

Document Level
All of the following document conditions are true

| Field | | Any Of | |
|---|---|---|---|
| Code | equals any of these▼ | [Add item] | [Delete] |

[Add document level conditions][Delete Last document level conditions]

Line Level
All of the following line conditions are true

[Add line level conditions]

FIGURE 7E

Schema

```
1  {
2    "type": "object",
3    "title": "Find and Replace Rule",
4    "description": "Find and Replace Rule updates a document based on conditions",
5    "required": [
6      "Expressions",
7      "AggregateExpressions",
8      "Data"
9    ],
10   "properties": {
11     "AggregateExpressions": {
12       "type": "array",
13       "title": "Aggregates",
14       "format": "table",
15       "items": {
16         "type": "object",
17         "properties": {
18           "Name": {
19             "type": "string"
20           },
21           "Aggregate": {
22             "type": "string",
23             "enum": [
24               "Sum",
25               "Count",
26               "Avg"
27             ]
28           },
29           "AggregateField": {
30             "type": "string",
31             "enum": [
32               "Line.Amount",
33               "Line.Quantity"
34             ],
35             "default": "None"
```

Match and Update Rule 1 | Delete Match and Update Rule |

When
All of the following are true

Document Level
All of the following document conditions are true

| Field | | Any Of | |
|---|---|---|---|
| BusinessIdentificationNo = | starts with any of these= | Add item  Delete Last item | Delete |
| | | item 1<br>VAT ← 705<br>Delete item | |

Add document level conditions | Delete Last document level conditions

FIGURE 7H

Then

Document Level
Update the following document level fields

[Add document level updates]

Line Level
Update the following line level fields

| Scope | Field | Value | |
|---|---|---|---|
| all lines | TaxCode | NTI | Delete |

707

[Add line level updates] [Delete Last line level updates]

[Add Match and Update Rule] [Delete Last Match and Update Rule]

[Save]

FIGURE 7I

DYNAMIC GRAPHICAL USER INTERFACE (GUI) FOR CUSTOM SOFTWARE RULE CREATION AND MANAGEMENT

CROSS REFERENCE TO RELATED APPLICATIONS

The present application claims priority to U.S. Provisional Patent Application No. 62/861,660, filed Jun. 14, 2019, entitled "BUILDING COMPLEX COMPLIANCE RULES USING DYNAMIC, CUSTOMER-SPECIFIC USER INTERFACE," the entire content and disclosure of which is hereby incorporated by reference in its entirety.

BACKGROUND

Many software applications provide user-customizable functionality. One such area of functionality includes rules that influence various actions to be taken by a software application given a particular set of criteria. However, the generation and management of software application rules in many conventional applications is often complex and cumbersome for users, thus diminishing the usefulness and efficiency of the software application.

Embodiments of the present disclosure address these and other issues by providing a dynamic graphical user interface (GUI) architecture that helps provide a user-friendly and flexible capability for software users to create and manage software application rules.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 5, 6, and 7A-7E depict examples of user interfaces according to various embodiments of the present disclosure.

FIG. 7F depicts an example of a data structure rule schema according to various embodiments of the present disclosure.

FIGS. 7G-7I depict examples of user interfaces according to various embodiments of the present disclosure.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
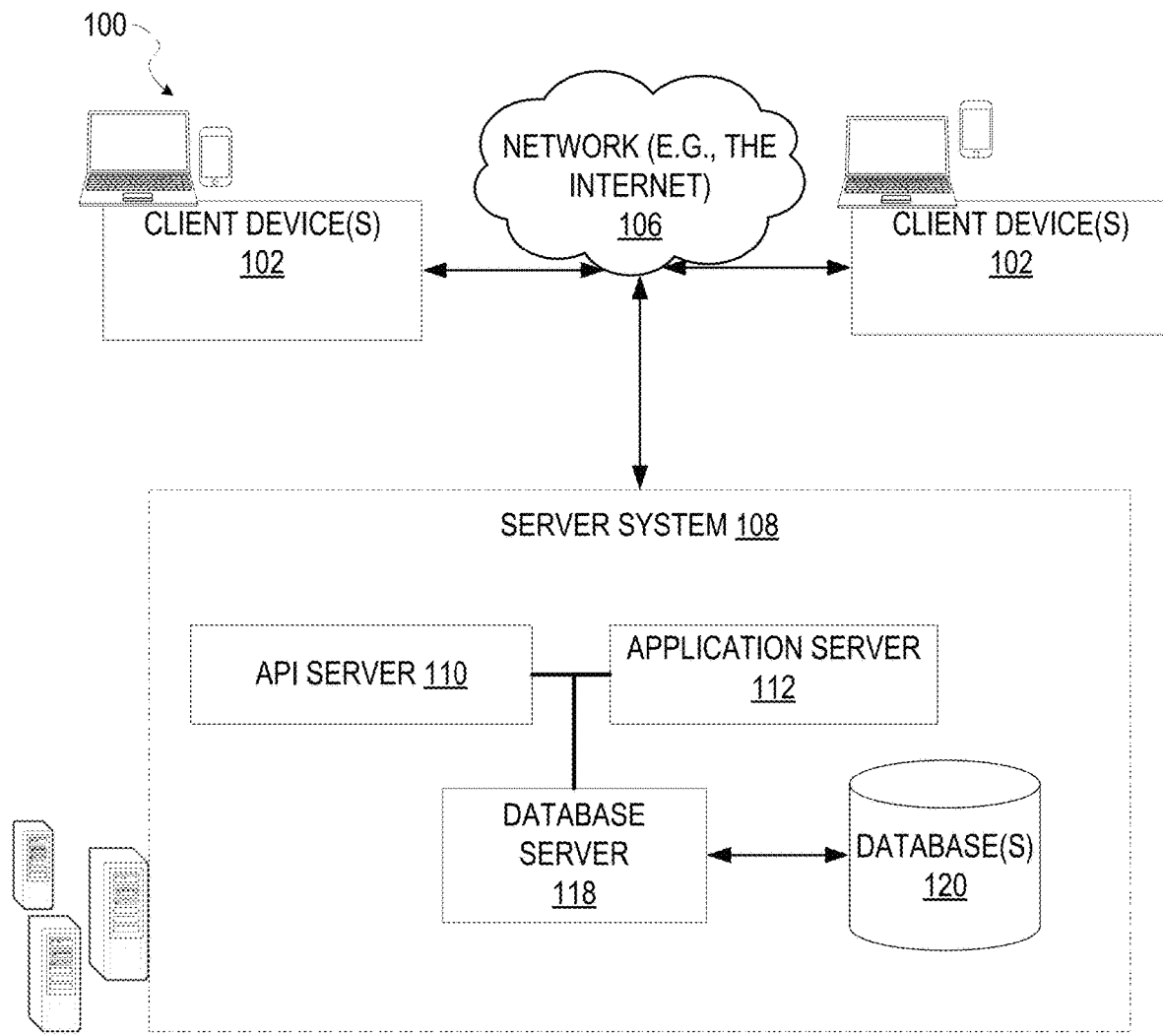
FIG. 1 is a block diagram showing an example of a system according to various embodiments of the present disclosure.

FIG. 1 is a block diagram showing an exemplary system 100 for exchanging data over a network. In this example, the system 100 includes multiple client devices 102, each of which may host a number of applications. In this context, a "client device" may refer to any machine that interfaces to a communications network to obtain resources from one or more server systems or other client devices. A client device may be, but is not limited to, a mobile phone, a desktop computer, a laptop, a portable digital assistant (PDA), a smart phone, a tablet, an ultra book, a netbook, a multi-processor system, a microprocessor-based or programmable consumer electronics device, a game console, a set-top box, or any other communication device that a user may use to access a network.

Each client device 102 may communicate and exchange data with other client devices 102, as well as with server system 108 via the network 106. Such data may include functions (e.g., commands to invoke functions) as well as payload data (e.g., text, audio, video or other multimedia data). In this context, the network 106 may be, or include, one or more portions of a network such as an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The server system 108 provides server-side functionality via the network 106 to one or more client devices (102). While certain functions of the system 100 are described herein as being performed by either a client device 102 or by the server system 108, it will be appreciated that some functionality may be interchangeably performed by either the client device 102 or by the server system 108. For example, it may be technically preferable to initially deploy certain technology and functionality within the server system 108, but later migrate this technology and functionality to a client device 102 having sufficient processing/memory capacity. Additionally, some functionality of embodiments of the present disclosure may be distributed across a plurality of different processors and/or computing devices, including one or more client devices 102 and server systems 108.

The server system 108 supports various services and operations that are provided to the client devices 102. Such operations include transmitting data to, receiving data from, and processing data generated by the client device 102. This data may include, for example, message content, client device information, geolocation information, database information, transaction data, social network information, and other information. Data exchanges within the system 100 are invoked and controlled through functions available via user interfaces (UIs) of the client devices 102.

In the example depicted in FIG. 1, system 108 includes an Application Programming Interface (API) server 110 that is coupled to, and provides a programmatic interface to, an application server 112. The API server 110 and application server 112 are communicatively coupled to a database server 118, which facilitates access to a database 120 including data that may be processed by the application server 112. In other embodiments, the functionality of the API server 110, application server 112, and database server 118 may be performed by more or fewer systems. In some embodiments, for example, server system 108 may comprise a single server having API functionality, application functionality, and database functionality.

In the example shown in FIG. 1, the API server 110 receives and transmits data (e.g., commands and message payloads) between the client device 102 and the server system 108. Specifically, the API server 110 provides a set of interfaces (e.g., routines and protocols) that can be called or queried by the one or more software applications running on a client device 102 in order to invoke functionality of the application server 112 or database server 118. The API server 110 exposes various functions supported by the application server 112, including account registration, login functionality, the sending of messages, search queries, and other functionality.

The application server 112 hosts a number of applications and subsystems. For example, the application server 112 may implement a variety of message processing technologies and functions, including various data-processing operations, with respect to data received within the payload of a message received from one or more client devices 102, or retrieved from one or more databases 120 by database server 118.

Dynamic Graphical User Interface (GUI) for Custom Software Rule Creation and Management As described in more detail below, embodiments of the present disclosure help provide a data-driven UI approach to offer a dynamic customer specific user interface with greater usability and flexibility compared to conventional systems. In contrast to rule editors that provide a static UI, embodiments of the present disclosure can dynamically render UI elements based on user choices and data.

Additionally, embodiments of the present disclosure provide templates or building blocks for complex scenarios and use cases, whereas conventional systems often require users to build custom complex rules from scratch for each of use case. Furthermore, embodiments of the present disclosure provide user-friendly interface that allows a user to define and manage rules based on intuitive use case scenario terms. Conventional systems, by contrast, often present a complex, difficult-to-use, programming-language-like interface that users must navigate to define rules. These rules may help with processing by a software service or software platform, such as the server system 108.

Figure 2:
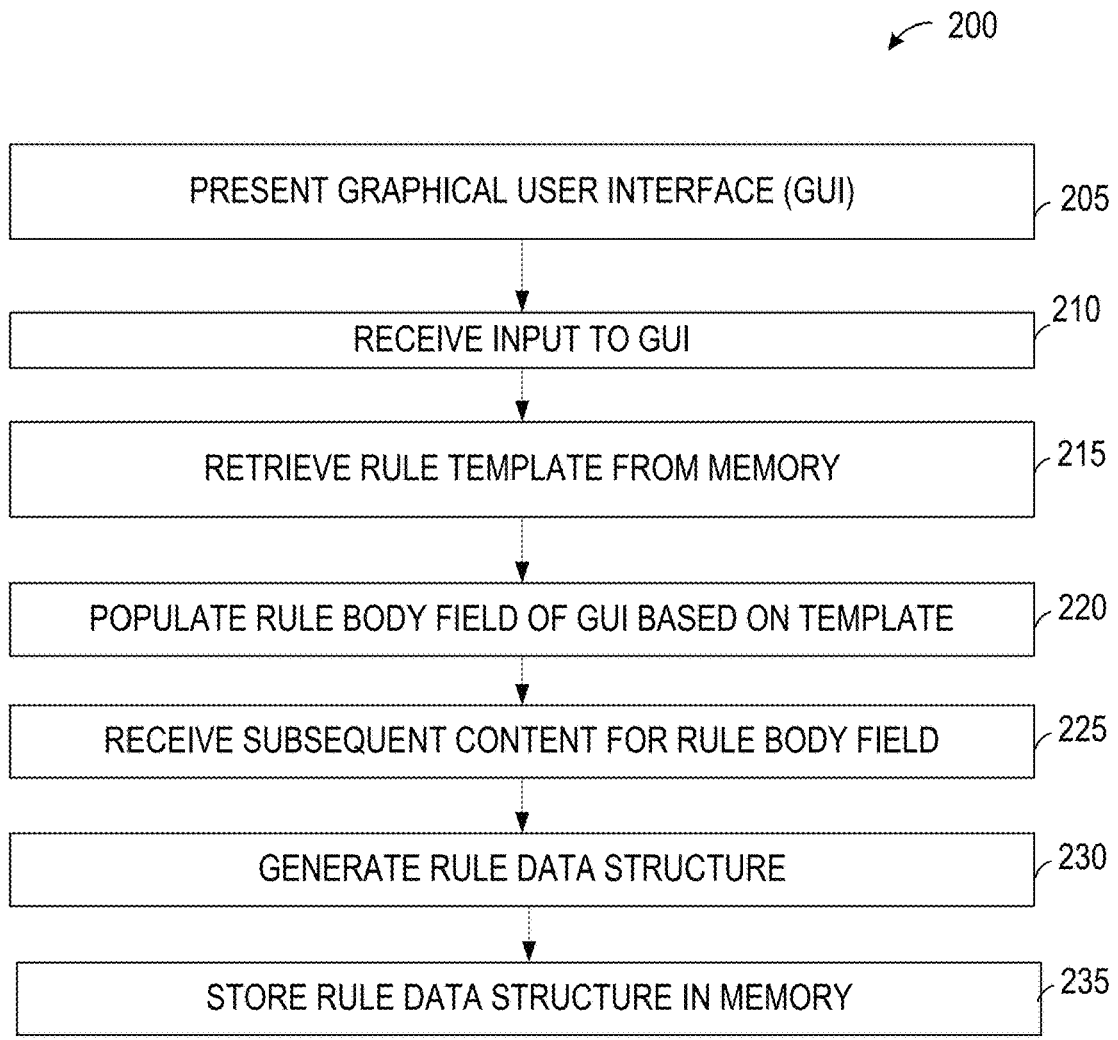
FIG. 2 is a flow diagram of an exemplary process according to various embodiments of the disclosure.

FIG. 2 depicts an exemplary process according to various aspects of the present disclosure. In this example, method 200 includes presenting a graphical user interface (GUI) (205), such as on the display screen of a client computing device 102 shown in FIG. 1. Method 200 further includes receiving input to the GUI (210), retrieving a rule template from memory (215), populating a rule body field of the GUI based on the template (220), receiving subsequent content (e.g., via input to the GUI from the client computing device) for the rule body field (225), generating a data structure defining a rule based on the content in the GUI (230), and storing the rule data structure in memory for future retrieval and execution (235). The steps of method 200 may be performed in whole or in part, in conjunction with each other as well as with some or all of the steps in other methods, and may be performed by any number of different systems, such as the systems described in FIGS. 1, 8, and 9.

In method 200, the system (such as server system 108 in FIG. 1) may present a GUI (205) on the display screen of a client computing device (such as client device 102) over a network (e.g., network 106). In alternate embodiments, the system may display the GUI on a display screen coupled to the system itself, or to another device.

The system may present a user-customized GUI to the user of the client computing device. In some embodiments, for example, presenting the GUI may include retrieving a lookup table from memory that includes data associated with the user, presenting data from the lookup table in conjunction with the GUI, and receiving a selection of data from the lookup table, via the client computing device, for inclusion in the rule body field for the desired rule. This data may also be included in rules created by the user. For example, the data from the lookup table may be included in the rule data structure via a reference value to the lookup table.

The GUI may include different portions associated with defining a rule. In some embodiments, for example, the GUI may include a rule identifier field to identify a rule to be created (also referred to herein as a "desired rule"), such as the "Name" field depicted in the exemplary screen shot 500 shown in FIG. 5. The GUI may further include a rule category field, such as the "Rule Type" field 505 in screen shot 500. In this example, the Rule Type field is a pull-down menu that allows the user to select from a list of rule types, though other UI features could also be used. The GUI may further include a rule body field to include one or more criteria defining one or more conditions for execution of the desired rule, as well as one or more actions to be taken in conjunction with execution of the desired rule when such criteria are met. Examples of rule criteria and actions are described in more detail below.

Method 200 further includes receiving (e.g., via the client computing device 102) input to the GUI (210). For example, the input to the GUI may include an identifier in the rule identifier field for a desired rule (e.g., a name of the rule), as well as a selection of a category associated with the desired rule in the rule category field. In response to such input, the system may retrieve (215) from memory a rule template associated with the selected category.

The rule template (examples of which are described in more detail below) may include criteria, actions, data, and other content upon which a user can base a new desired rule. The system may populate (220), based on the retrieved rule template, one or more initial criteria in the rule body field defining one or more conditions for execution of the desired rule and one or more initial actions to be taken in conjunction with execution of the desired rule in the rule body field. The system may store a variety of different rule templates in memory (e.g., one or more rule templates associated with each selectable rule category), such that the one or more initial criteria and one or more initial actions associated with the retrieved rule template may be different from criteria and an actions associated with a second rule template stored in the memory. The contents of the rule templates need not be entirely different however, and in some embodiments a first rule template may have some criteria or actions in common with a second rule template.

In some embodiments, the one or more initial criteria from the template may include an operator, such as a logical operator (e.g., AND, OR, etc.) or a mathematical operator (e.g., +, −, etc.). The one or more initial criteria may also a conditional statement. In some embodiments, for example, the conditional statement may include: whether a data field starts with one or more values, whether a data field ends with one or more values, whether a data field is blank, or whether a data field is not blank. Embodiments of the present disclosure may include any number of suitable initial criteria.

The system may populate the rule body field of the GUI with any number of suitable actions to execute in response to satisfaction of the criteria. In some embodiments, for example, the one or more initial actions are to modify a subsequent incoming request received by the computer system from the client computing device. For example, the system may modify a request received by the system via an application program interface (API) from the client computing device.

Modification of the request may include, for example, adding, removing, or changing a data field in the incoming request. In some embodiments, for example, modifying the incoming request includes updating a description of a data field in the incoming request that is added or changed.

In some embodiments, the action may be to modify a subsequent outgoing response from the computer system to a client computing device. For example, the response may be transmitted by the computer system via an application program interface (API) to the client computing device.

In some embodiments, the action to be taken may be to populate one or more data structures with data upon execution of the desired rule. In some embodiments, the action to be taken may be to validate one or more data objects, as well as to store the one or more data objects in the memory upon successful validation.

Method 200 further includes receiving (e.g., via the client computing device 102), subsequent content for the rule body field (225). For example, the subsequent content may include one or more subsequent criteria and one or more subsequent actions associated with the desired rule. In this manner, the user can customize the criteria or actions initially populated from the template in the rule body field to suit the user's specific use case.

Method 200 further includes generating, based on the criteria and actions associated with the desired rule, a data structure defining the desired rule (230), and storing the data structure in the memory for subsequent retrieval and execution (235). In some embodiments, the data structure may be formatted in Javascript Object Notation (JSON), as illustrated in the example shown in FIG. 7F, though other formats may be used in accordance with embodiments of the disclosure.

As noted above, the system may store different rule templates containing different rule criteria and/or actions. Accordingly, after creating a first rule (stored in a first rule data structure) using a first rule template, a user may subsequently create a second rule (using the process described above) using a second rule template that contains (at least partially) different criteria or actions. This second rule may be stored in memory within a second rule data structure.

Figure 3:
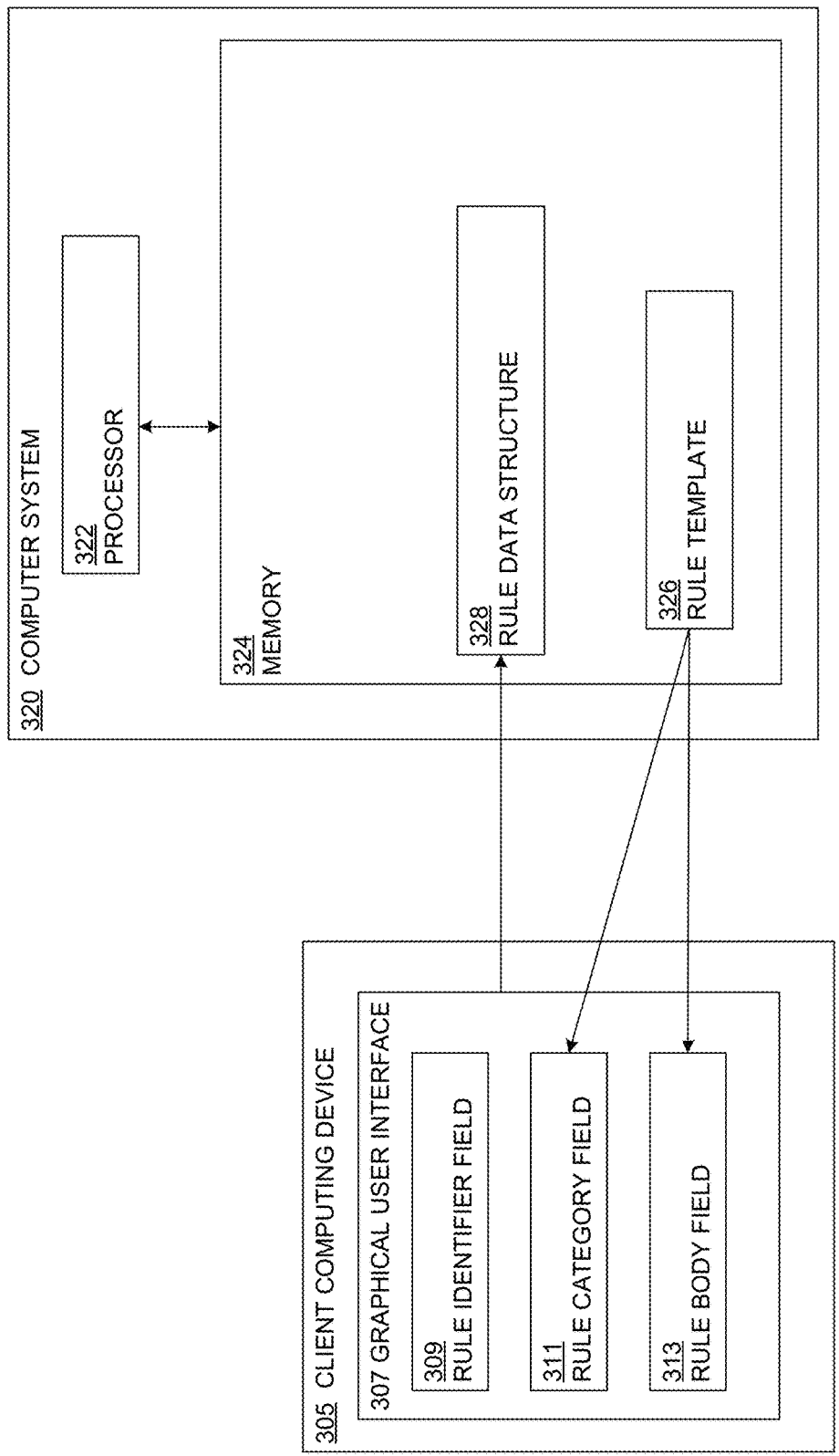
FIG. 3 depicts an exemplary functional block diagram according to various embodiments of the present disclosure.

FIG. 3 is a functional block diagram of an architecture illustrating the operation of the process 200 shown in FIG. 2. The functionality of the system in FIG. 3 may be performed by any number of different systems, such as the systems described in FIGS. 1, 8, and 9.

In this example, computer system 320 includes a processor 322 coupled to a memory 324 storing one or more rule templates 326. The computer system 320 displays a GUI 307 on the display screen of client computing device 305. In response to input to the GUI with selections to the rule identifier field 309 and rule category field 311 by the user of client computing device 305, the computer system 320 retrieves a rule template 326 and populates the rule body field 313 of the GUI with initial content (e.g., initial criteria and actions for the rule being created). The user may add, remove, or modify the contents of the rule body field 313 and the system generates a rule data structure 328 based on the contents of the GUI. The rule data structure 328 is then stored in memory 324 for later retrieval and execution.

Figure 4A:
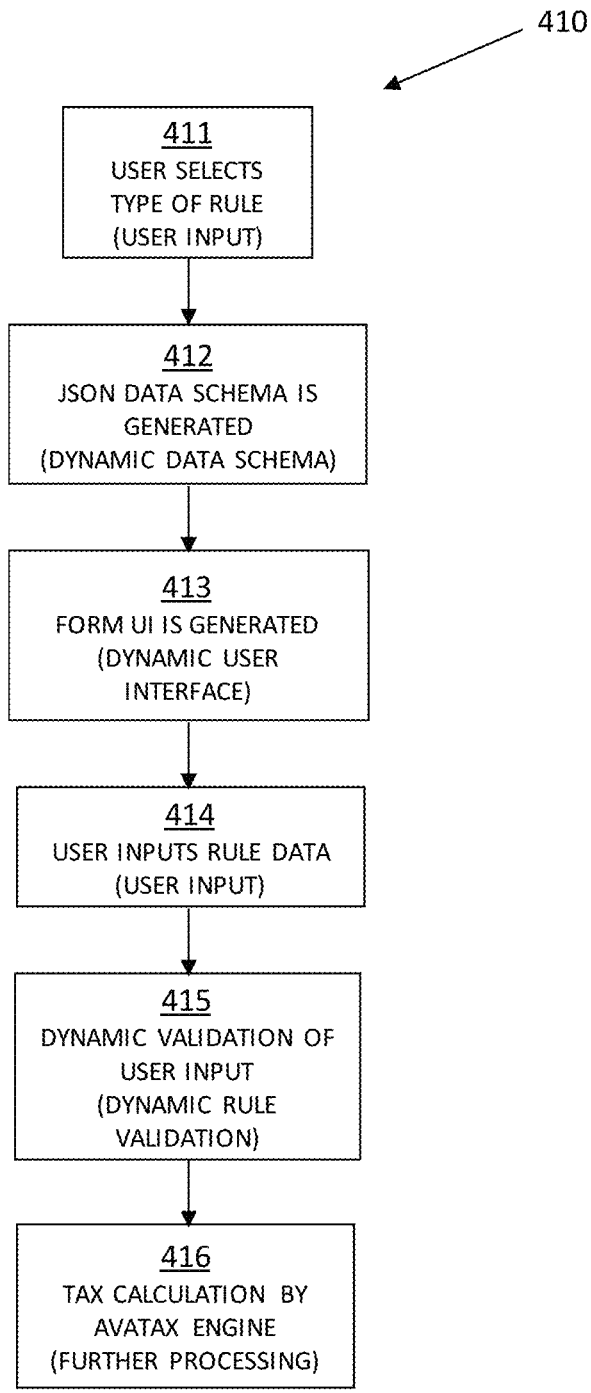
FIGS. 4A-4F depict exemplary flow diagrams according to various embodiments of the present disclosure.

FIG. 4A illustrates an example of a process flow diagram in accordance with some embodiments of the present disclosure. In this example, based on user input and selection (411), a JSON data schema is generated (412) and a user interface is rendered dynamically based on the generated schema (413). The user inputs rule data (414) which will validated dynamically (415). The output of this rule may be passed to other software applications for execution, such as tax calculation (416) in one example. Accordingly, embodiments of the present disclosure allow a user-specific and/or scenario-specific UI to be dynamically generated without the need to develop and release new software for presenting the UI for each user/scenario. The UI may read the JSON data schema to render form UI elements required for user data input, and the JSON schema can be dynamically generated with customer and system data (e.g., based on the rule templates described previously).

Regarding step 411 in FIG. 4A, embodiments of the present disclosure may present a variety of different rule types based on, for example, the nature of the software application for which the rule is to apply. For example, Table 1 below illustrates some examples of rule types that may apply for a tax calculation software application.

TABLE 1

| Rule Type | Description |
| --- | --- |
| Marketplace | Identify & tag marketplace sales where marketplace has already remitted taxes |
| Match & Update | Update taxability and other inputs based on a criteria |
| Allocation | Allocate an invoice line for better handling of taxability and jurisdictions |
| Bundled Items | Take care of taxability for bundled items |
| Multiple points of use | Handle multiple points of use taxability implications for software sales |

TABLE 1-continued

| Rule Type | Description |
| --- | --- |
| Manufacturer's coupon/rebate | Define the discount treatment when its' a rebate or coupon from manufacturer |
| Add Fee | Define a criteria and insert additional invoice line for fee |
| Add Discount | Define a criteria and insert discount line |

In some embodiments, a user can build complex custom rules using a web interface customized for scenario and user data. In some embodiments, the system may utilize "populator" functions to populate user-specific data, as well as "validator" functions which validate rule data against a specific scenario. In some embodiments, the system may provide a rule template management portal (also referred to herein as an "admin portal"), such as a web interface which is used to manage rules and templates. In some embodiments, user-uploaded master data can be referenced (e.g., via lookup tables stored in memory) while defining rule criteria or treatment, and users may pass user-defined data with a transaction to make use of this data in an advanced rule via user-defined fields (also referred to herein as "flexible fields" or "flex fields", which are also further described below.

In one exemplary embodiment, a rule may refer to a rule schema saved with user specific data. This user specific data is the input data for rule criteria and its treatment. In this example, the rule may include a rule header that has a rule type (scenario specific template), effective start and end dates, and a name. The rule may further include a rule body having two sections: a criteria section that defines conditions for the rule to execute, and a treatment (or "action") section that defines the treatment/action when the conditions of the criteria are met.

In some embodiments, rule criteria can be built using various types of data inputs, such as API inputs and outputs, lookup tables (e.g., user uploaded data lists), user profile data, and user-defined flexible fields. In some embodiments, a rule may be categorized based on its timing of execution with respect to a software application's APIs. For example, one such category includes "request rules" that execute on a request sent to a software application using an API and as a result modify the incoming request (e.g., before tax calculation occurs in a tax calculation application). Another such category includes response rules that execute on a response given by a software application via its API and, as a result, modify the outgoing response (e.g., after tax has been calculated in a tax calculation application).

FIG. 5 illustrates and example of a GUI screen 500 that asks for inputs which facilitate the beginning of creating a rule. In some embodiments, rule templates may be customized for each of a plurality of users. For example, a first user may see a first selection of rule templates in response to selecting a "Rule Type" 505 in the exemplary screen 500 shown in FIG. 5, while a second user may see a second selection of rule templates (at least partially different from the first selection). In this manner, the rule types may refer to the templates based on the identity of a particular user, thereby allowing users to access appropriate rule templates pre-built for various complex scenarios to provide an efficient way for the user to create a rule.

In some embodiments, rule templates can be categorized based on their availability to users. For example, some rule templates may be categorized as "ungated templates" and are made available to all users to allow ungated access to their functionalities. In other cases, some rule templates may be categorized as "gated templates" and are made available to one or more specific users based on the users' particular needs and entitlements.

The templates may thus provide the basis for rendering a use case scenario specific user interface based on a JSON schema as well as a more generic schema allowing users to build various use cases. In some embodiments, rule templates may be classified based on a particular software application. In the case of a tax calculation software application, for example, "generic find and replace" templates may allow users to build a match criterion for inputs and update one or more request values prior to tax calculation by the software application. Rule templates for the tax calculation software could also be classified as "generic allocation templates," which allow a user to split an invoice line across multiple ones based on a number of parameters.

In some embodiments, a user can access the rule creation GUI via a web interface. FIG. 6 illustrates an example of a UI screen 600 that includes a link 605 to allow a user to "manage advance transaction rules." FIG. 7A illustrates an example of a UI screen presented subsequent to selection of the link 605 in screen 600 that provides a UI feature 701 to allow a user to "add an advanced rule," selection of which brings up the initial rule creation screen 500 depicted in FIG. 5.

In some embodiments, as depicted in FIG. 7B, a user selects one of the templates and then builds the criteria using a rule set builder. A rule is defined as a set of criteria (e.g., WHEN conditions) and a treatment/action (e.g., THEN section). Criteria can be built using document level as well as line level (e.g., sales invoice) data sent to the software application the rule operates in conjunction with. The rule builder screen depicted in FIG. 7B allows a user to include a number of operators, such as starts with any of these, ends with, equals to any of these, does not equal, is not blank, is blank, various mathematical operators such as >, <, >=, <=, =, etc. The treatment/action may also have access to document and line level data various operators depending on the specific rule template.

As noted above, embodiments of the present disclosure may utilize populator functions to allow a user to populate a rule definition with their data while building criteria or defining a treatment/action. Similarly, validator rules may automatically validate rule data entered by a user against rule schema to save a rule execution from any errors. The rule may then be saved with customer execution criteria and data specific to a user's account.

Figure 4B:
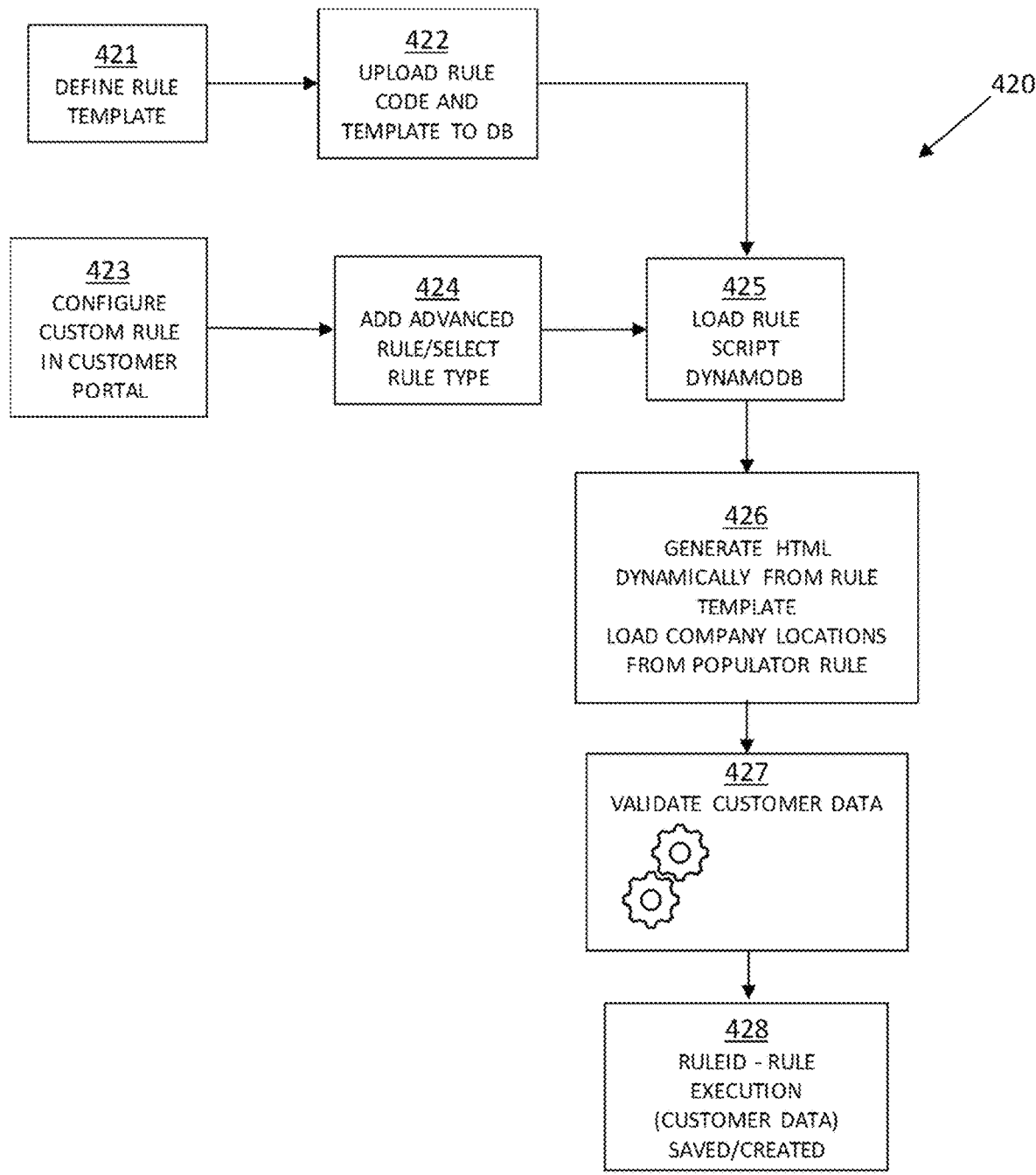

FIG. 4B illustrates an example of a workflow 420 for creating and saving a rule. In this example, a rule template is defined (421) and rule code and the rule template are uploaded to a database (422). A user may configure a custom rule (423) and add an advanced rule or select a rule type (424). The rule script is loaded (425) and hypertext machine language (HTML) generated from the rule template (426). Data associated with a user (e.g., a customer) is validated (427) and the rule executed (428).

Figure 4C:
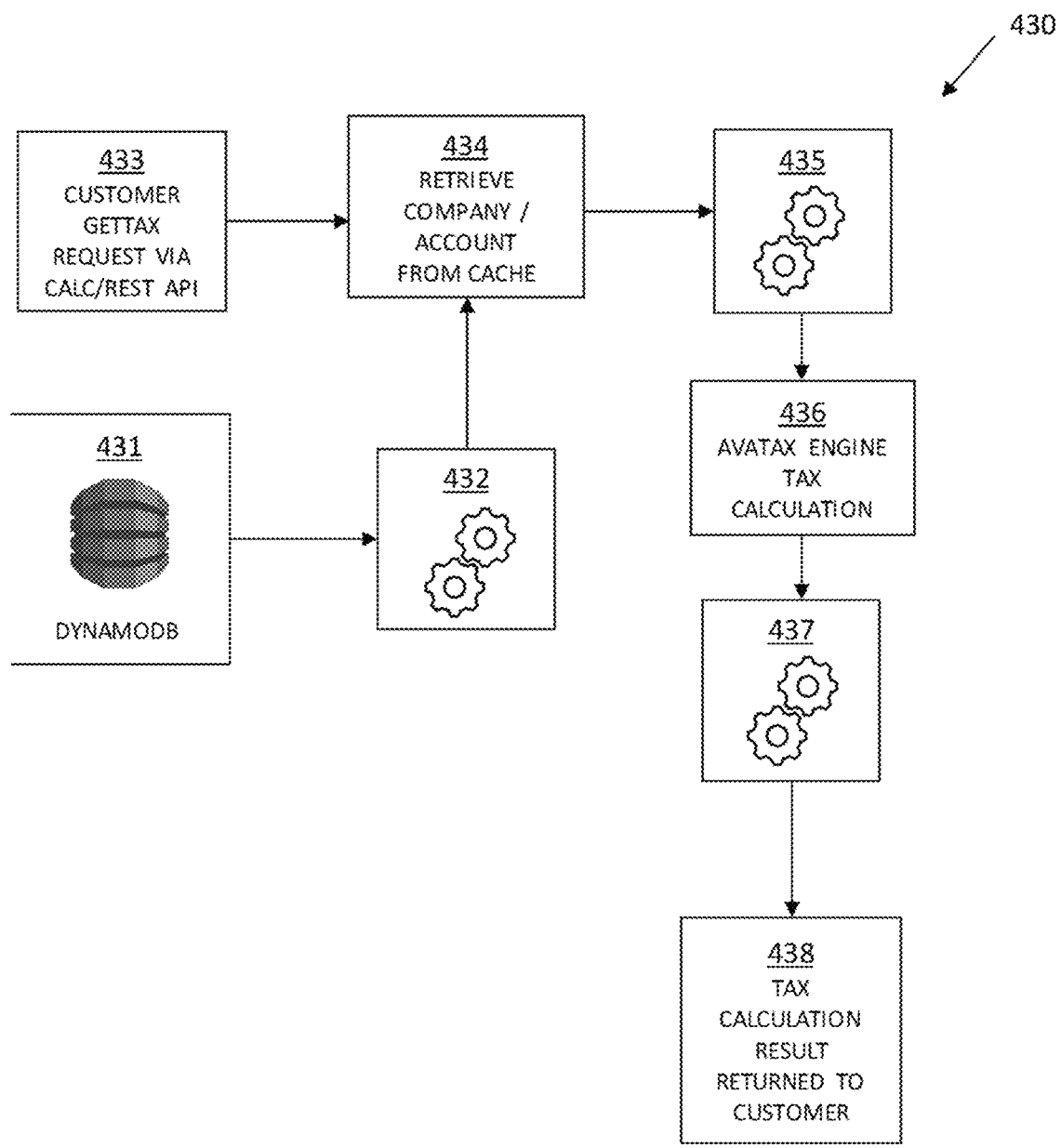

FIG. 4C illustrates an example of a workflow 430 for executing a rule. For example, a may be rule is executed in real-time or near-real-time against a user's request to a software application (e.g., via an API). In the case of a software application for calculating taxes, for example, rules could be categorized based on their timing of execution. For instance, a "request rule" may execute on a tax calculation request sent to a tax calculation software application using an API and, as a result, modify the incoming request. Similarly, a "response rule" may execute on a tax calculation response given via the tax software API and, as a result, modify the outgoing response.

Continuing with the example of the tax calculation software with reference to FIG. 4C, a sales tax calculation request may be received by the application as an API call (433). An advanced rules engine looks for a user's specific rule criteria (431, 432, 434) and evaluates it against the API request. If it finds a match for criteria, then it executes the rule and as a result modifies the API request (435). This modified request is then passed to the tax software for a sales tax determination process (436). Likewise, a response rule is evaluated against a tax calculation response and if there's a criteria match then the rule is executed (437), and the API response is modified prior to the response being transmitted (438).

Figure 4D:
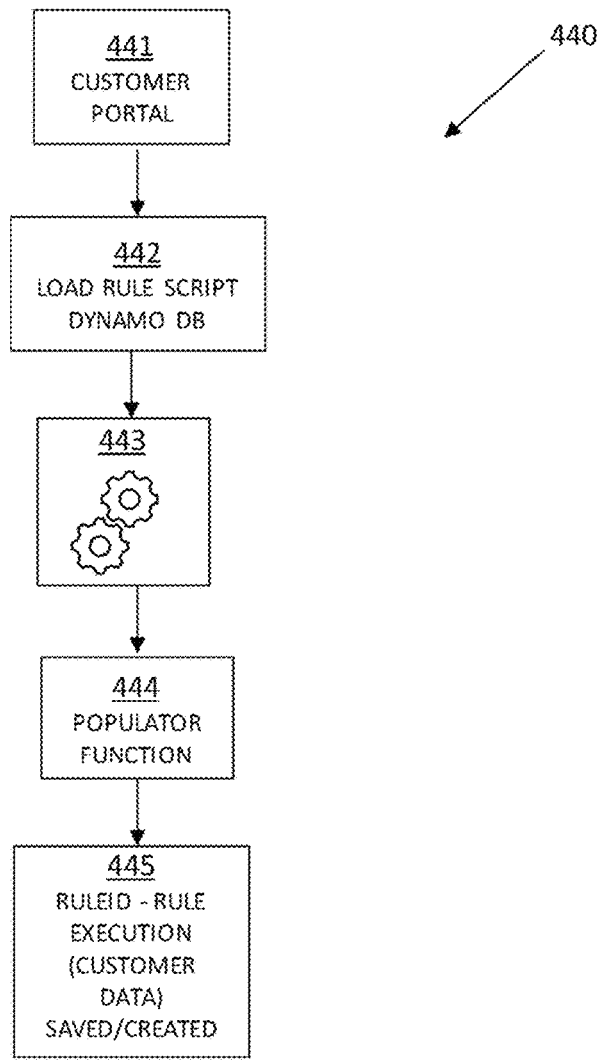

FIG. 4D illustrates an example of a workflow 440 for executing a populator function in accordance with some embodiments. In this example, a user access a customer portal (441), and loads a rule script from a database (442). Data associated with the user (e.g., a customer) is validated (443). Rule code (e.g., HTML) is generated from a rule template and data (e.g., company profile data) is loaded via the populator function (444) to populate various fields of the rule. The rule may then be executed (445).

FIG. 7C illustrates an example of a GUI screen having a selection option for a populator function 703. In the case of the tax software example, for instance, a populator function may populate account-specific tax profile data for a user, such as jurisdictions, locations, items, tax codes, and user-uploaded data, and thereby help a user customize a rule without having to manually enter such information.

Figure 4E:
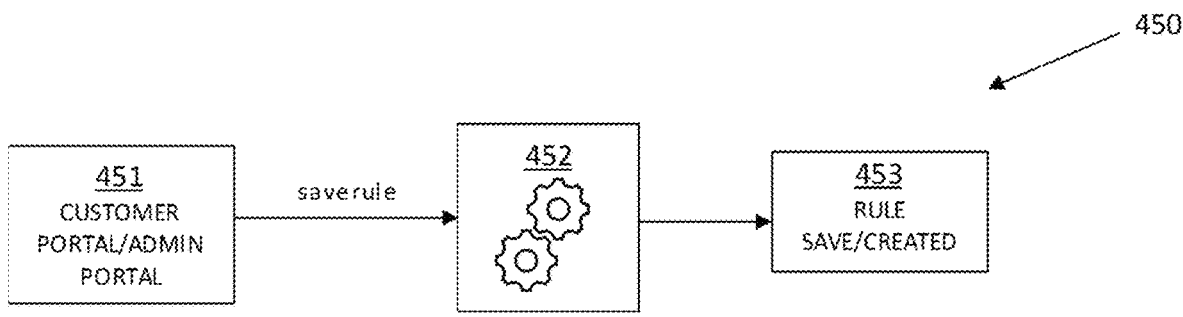

FIG. 4E illustrates an example of a workflow 450 for executing a validator function in accordance with some embodiments. In this example, a user accesses an admin portal (discussed in more detail below) to generate/save a rule (451). The rule may be compiled and validated (452) and the validated rule saved/created (453). In some embodiments, a validator function may validate user data against a rule schema. In some embodiments, user entries may also be validated with reference to a user's prior stored profile data or other information to help ensure that any data entered by a user comports to the previously-stored information. Among other things, this helps avoid a rule having errors during runtime and helps users be more efficient when creating rules.

Figure 4F:
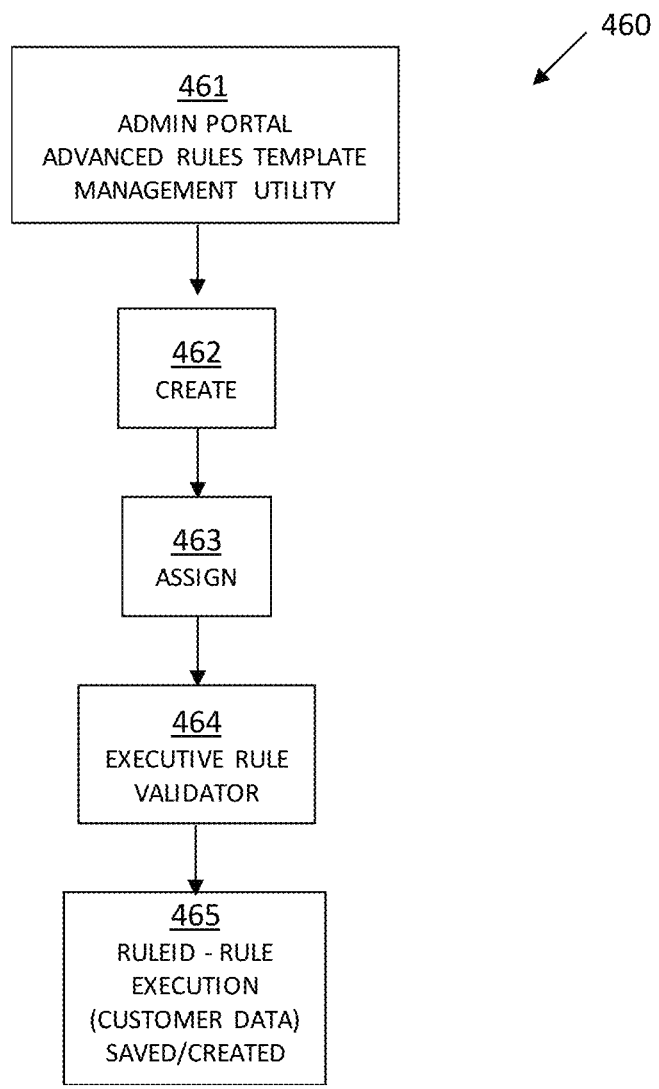

FIG. 4F illustrates an example of a workflow 460 associated with a rule template management portal (also referred to as "admin portal"). In this example, a user accesses the admin portal (461) to create a rule from a rule template (462), and/or to create and modify instances of template data to be included for a rule associated with an entity. Rules may be assigned (463) to one or more entities (e.g., a company or other organization), and validated (464). Successfully validated rules may then be executed (465).

FIG. 7D illustrates an exemplary UI screen associated with an admin portal web interface. In this example, the admin portal allows creation and management of rules and templates as an addition to a customer portal. This interface may be used by users to create and deploy complex custom rules. FIG. 7D, for example, illustrates the assignment of a rule using a rule template to a customer account for "AvaTax" tax software, while FIG. 7E illustrates the creation of a rule using a template in the admin portal. With reference to the workflow in FIG. 4F, the admin portal's functions include: (1) creation of a rule; (2) creation of a rule template; (3) assignment of a rule to a customer account; (4) querying accounts for active rules; and (4) the management of rules by partners for their assigned AvaTax customer accounts.

Embodiments of the present disclosure may store and retrieve data in a variety of formats. In some embodiments, for example, the system may utilize lookup tables comprising data lists uploaded by users to bring master data from their historical systems to a software application, and then use such data for reference while building a rule's criteria or treatment. In some embodiments, lookup tables can be uploaded in CSV (Comma Separated Values) format. In some embodiments, via the rule creation GUI, users can upload lookup tables (e.g., CSV files) with their own data in columns, edit and update already uploaded files, delete files, and reference values from lookup tables into a rule. Among other things, lookup tables thus help provide flexibility and efficiency for users building complex custom rules based on their own data.

In some embodiments, the system may provide flexible fields (also referred to herein as "flex fields") in conjunction with the rule creation GUI. In this context, flex fields refer to user defined fields which can be passed as API inputs to a software application in addition to the application's own named inputs. These can also be used to return user and transaction specific values in API response. Embodiments of the present disclosure may allow users to pass additional values to an API, receive additional values in an API response, and map these additional fields to their system fields and label them to make them usable, and to reference them in a rule. In this manner, flex fields help provide an efficient and user-friendly mechanism to build and use complex custom rules.

Figure 7G:
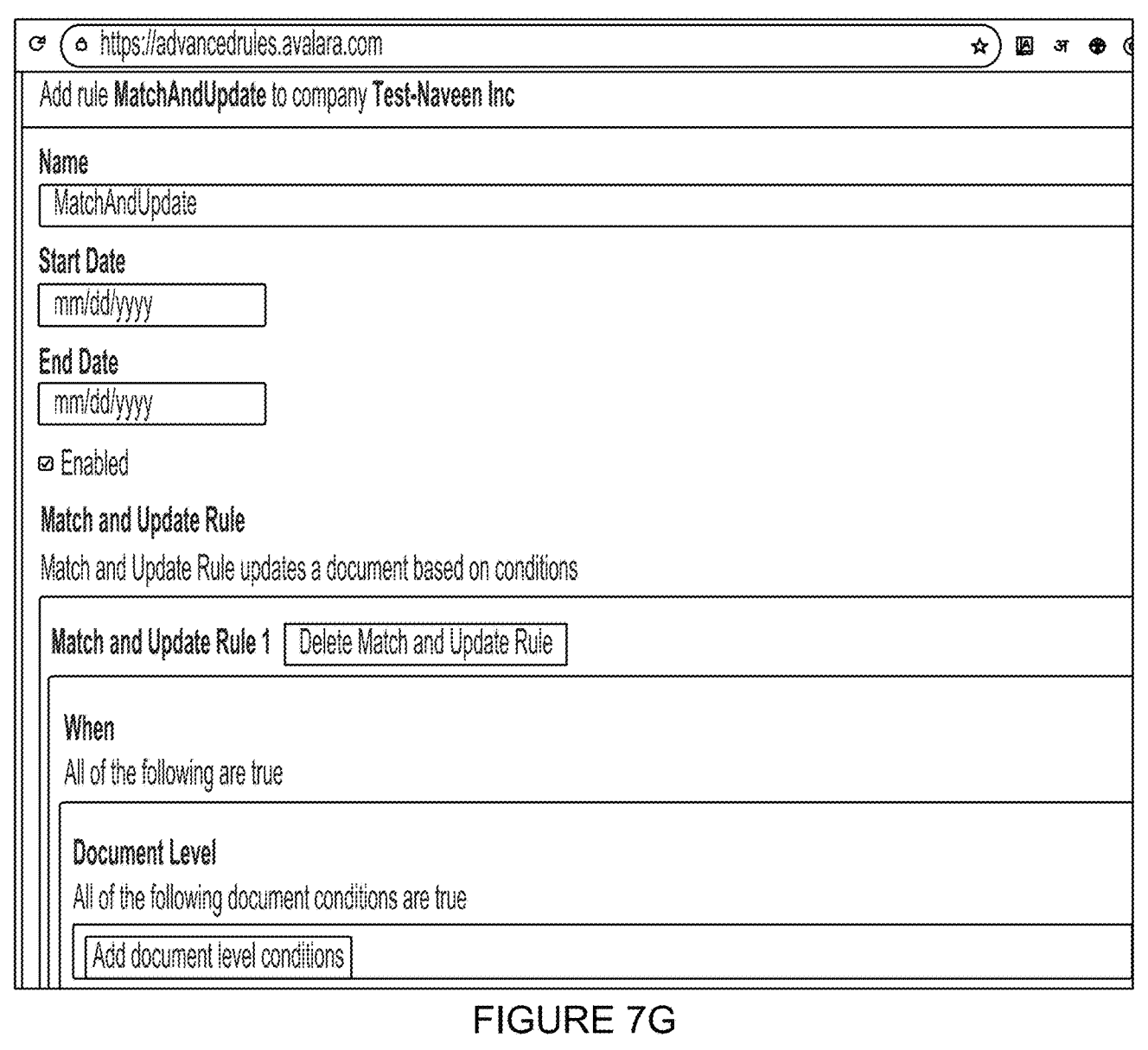

FIGS. 7G-7I illustrate a particular example of an embodiment of the present disclosure. In this example, a rule is created for a tax calculation software application by a user via the rule creation GUI. In this particular example, the user does not want to charge a value-added tax (VAT) on business to business sales. FIGS. 7G and 7H illustrate the creation of the rule using a template in the admin portal, where the user defines a rule using rule type "Match & Update" where the user defines the rule as—Whenever there is a Business Identification Number passed on invoice starting with "VAT" (box 705 in FIG. 7H) then treat all invoice lines as non-taxable.

FIG. 7H illustrates the selection of WHEN criteria fields such as Business Identification number and providing its value "VAT." FIG. 7I illustrates the selection of line level field TaxCode and providing its' value "NT" (box 707) in the THEN section.

Software and System Architectures

Figure 8:
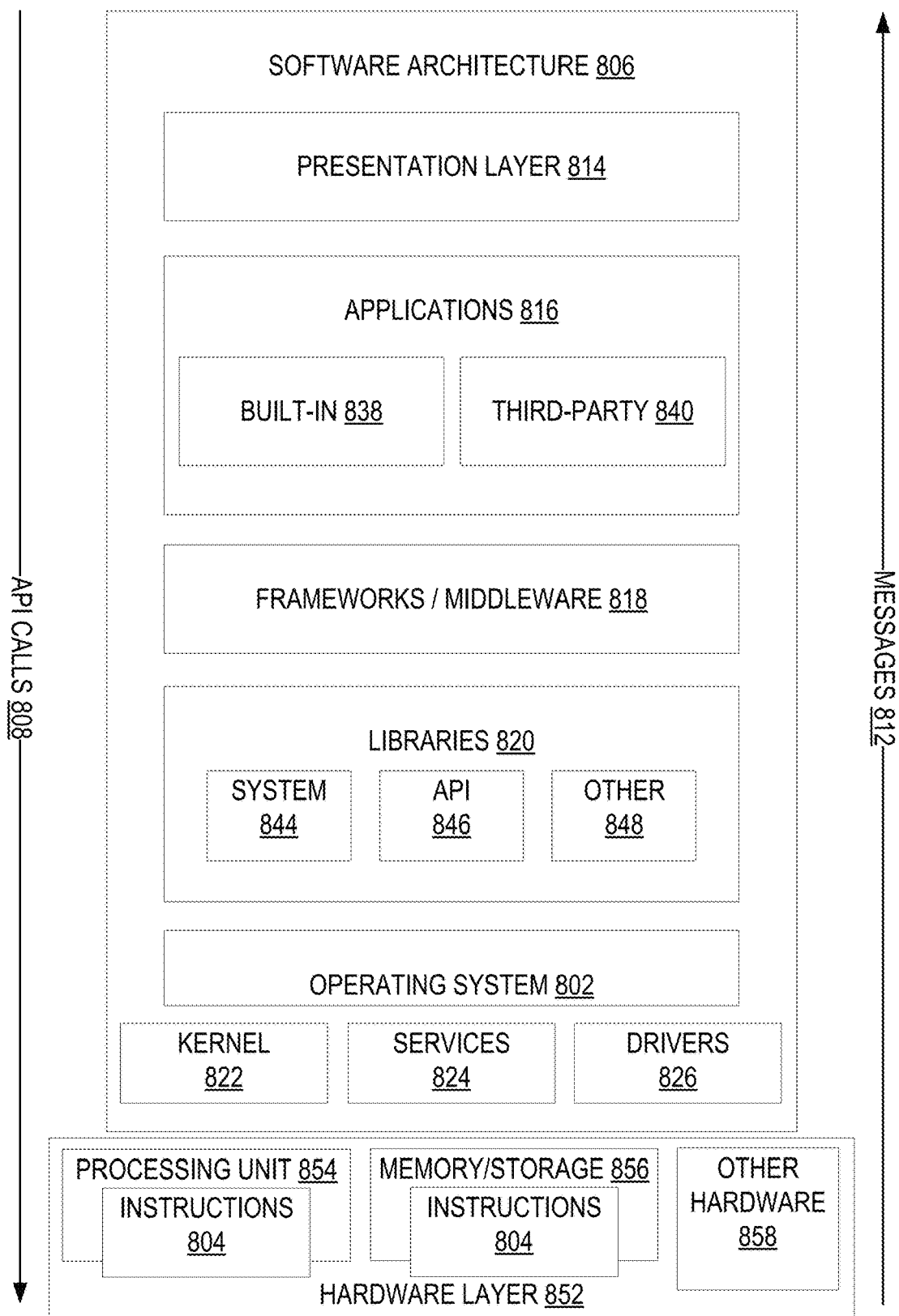
FIG. 8 is a block diagram illustrating an exemplary software architecture which may be used in conjunction with various hardware architectures herein described.

FIG. 8 is a block diagram illustrating an exemplary software architecture 806, which may be used in conjunction with various hardware architectures herein described. FIG. 8 is a non-limiting example of a software architecture and it will be appreciated that other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

As used herein, a "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled.

Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of exemplary methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive responses to the API calls 808. Various messages 812 may be transmitted and received via the applications 816 and/or other components within the layers. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
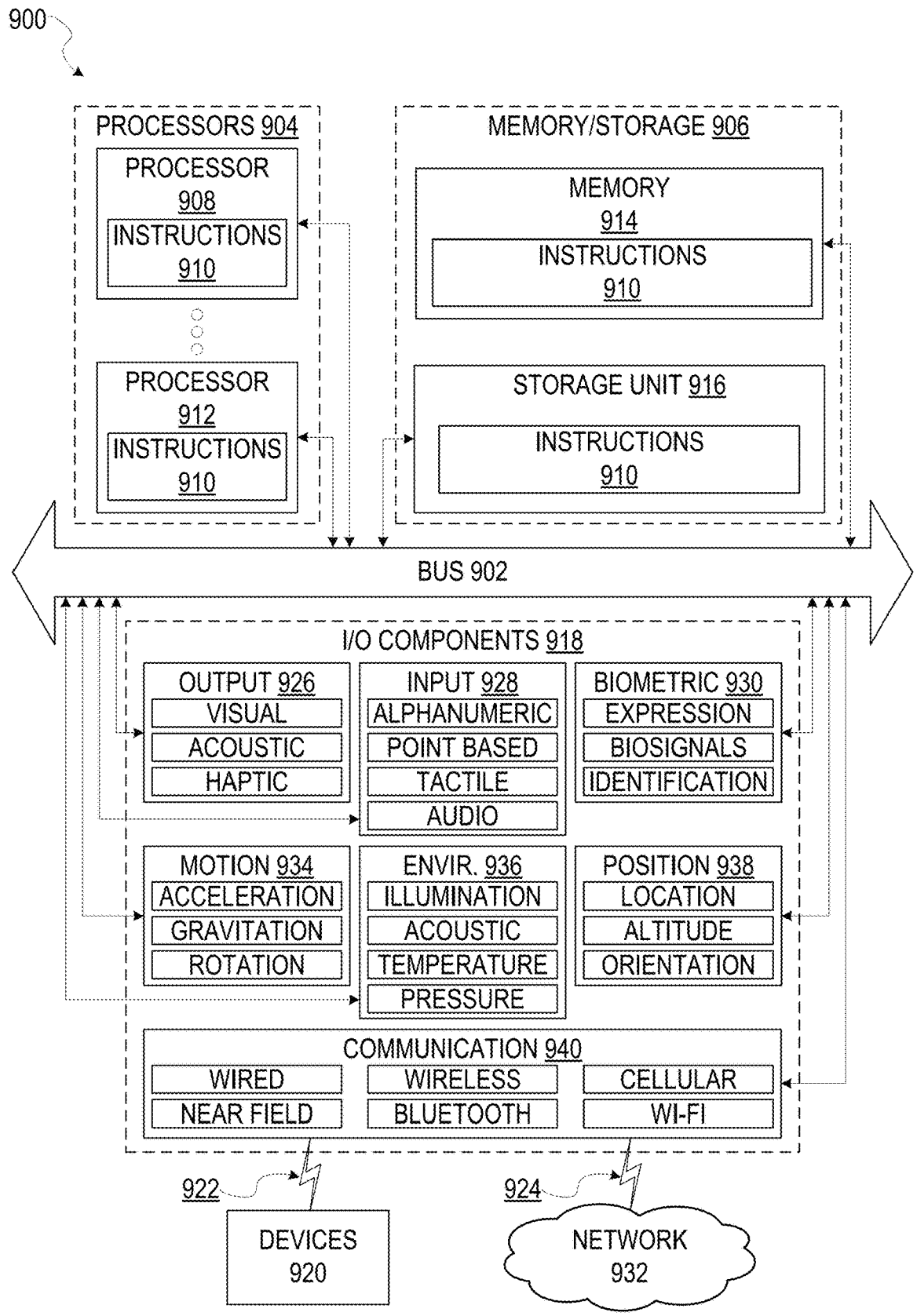
FIG. 9 is a block diagram illustrating components of an exemplary computer system according to some exemplary embodiments, which may read instructions from a machine-readable medium (e.g., a non-transitory computer-readable medium) and perform any one or more of the processes and methodologies discussed herein.

FIG. 9 is a block diagram illustrating components of a machine 900, according to some exemplary embodiments, able to read instructions from a machine-readable medium (e.g., a computer-readable storage medium) and perform any of the processes, methods, and/or functionality discussed herein. Specifically, FIG. 9 shows a diagrammatic representation of the machine 900 in the exemplary form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described.

In some embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may be or include, but is not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" or "computer system" shall also be taken to include a collection of machines or computer systems that individually or jointly execute the instructions 910 to perform any of the methodologies discussed herein.

The machine 900 may include processors 904 (e.g., processors 908 and 912), memory memory/storage 906, and I/O components 918, which may be configured to communicate with each other, such as via bus 902. The memory/storage 906 may include a memory 914, such as a main memory, or other memory storage, and a storage unit 916, both accessible to the processors 904 such as via the bus 902. In this context, a "processor" may refer to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media. In this context, "machine-readable medium" refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various exemplary embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. Collectively, one or more of the I/O components 918 may be referred to as a "user interface" for receiving input, and displaying output, to a user. Additionally, the term "user interface" may be used in other contexts such as, for example, to describe a graphical user interface (e.g., a window displayed on a display screen to receive input from, and display output to, a user).

In further exemplary embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer system comprising:
   a processor; and
   a memory coupled to the processor and storing instructions that, when executed by the processor, cause the computer system to perform operations comprising:
   presenting, on a display screen of a client computing device in communication with the computer system, a graphical user interface (GUI) that includes: a rule identifier field, a rule category field, and a rule body field;
   receiving, via the client computing device, input to the GUI that includes:
     an identifier in the rule identifier field for a desired rule; and
     a selection of a category associated with the desired rule in the rule category field;
   retrieving from the memory, in response to the selection of the category associated with the desired rule, a rule template associated with the selected category;
   populating, based on the retrieved rule template:
     one or more initial criteria in the rule body field defining one or more conditions for execution of the desired rule; and
     one or more initial actions to be taken in conjunction with execution of the desired rule in the rule body field, in which the one or more initial criteria and one or more initial actions associated with the retrieved rule template are different from criteria and an actions associated with a second rule template stored in the memory;
   receiving, via the client computing device, one or more subsequent criteria and one or more subsequent actions associated with the desired rule;
   generating, based on the criteria and actions associated with the desired rule, a data structure defining the desired rule; and
   storing the data structure in the memory for subsequent retrieval and execution.

2. The computer system of claim 1, in which the one or more initial criteria includes a logical operator or a mathematical operator.

3. The computer system of claim 1, in which the one or more initial criteria includes a conditional statement.

4. The computer system of claim 3, in which the conditional statement includes: whether a data field starts with one or more values.

5. The computer system of claim 3, in which the conditional statement includes: whether a data field ends with one or more values.

6. The computer system of claim 3, in which the conditional statement includes: whether a data field is blank.

7. The computer system of claim 3, in which the conditional statement includes: whether a data field is not blank.

8. The computer system of claim 1, in which the one or more initial actions are to modify a subsequent incoming request received by the computer system from the client computing device.

9. The computer system of claim 8, in which the request is received by the computer system via an application program interface (API) from the client computing device.

10. The computer system of claim 8, in which modifying the incoming request includes adding, removing, or changing a data field in the incoming request.

11. The computer system of claim 10, in which modifying the incoming request includes updating a description of a data field in the incoming request that is added or changed.

12. The computer system of claim 1, in which the action is to modify a subsequent outgoing response from the computer system to a client computing device.

13. The computer system of claim 12, in which the response is transmitted by the computer system via an application program interface (API) to the client computing device.

14. The computer system of claim 1, in which the action to be taken is to populate one or more data structures with data upon execution of the desired rule.

15. The computer system of claim 1, in which the action to be taken is to validate one or more data objects.

16. The computer system of claim 15, in which the action to be taken further includes storing the one or more data objects in the memory upon successful validation by the computer system.

17. The computer system of claim 1, in which presenting the GUI includes:
   retrieving, from the memory, a lookup table including data associated with a user, in which the data from the lookup table is included in the rule via a reference value to the lookup table;
   presenting data from the lookup table in conjunction with the GUI; and receiving a selection of data from the lookup table, via the client computing device, for inclusion in the rule body field for the desired rule.

18. The computer system of claim 1, in which the memory further stores instructions for causing the computer system to perform operations comprising:
receiving, via the client computing device:
a second identifier in the rule identifier field for a second desired rule; and
a second selection of a category associated with the second desired rule in the rule category field;
retrieving from the memory, in response to the selection of the category associated with the desired rule, the second rule template that is associated with the selected second category;
populating, based on the second rule template, second initial criteria and second initial actions in the rule body field;
receiving, via the client computing device, second subsequent criteria and second subsequent actions associated with the second desired rule;
generating, based on the criteria and actions associated with the desired rule, a second data structure defining the second desired rule; and
storing the second data structure in the memory for subsequent retrieval and execution.

19. A non-transitory computer-readable medium storing instructions that, when executed by a computer system, cause the computer system to perform operations comprising:
presenting, on a display screen of a client computing device in communication with the computer system, a graphical user interface (GUI) that includes: a rule identifier field, a rule category field, and a rule body field;
receiving, via the client computing device, input to the GUI that includes:
an identifier in the rule identifier field for a desired rule; and
a selection of a category associated with the desired rule in the rule category field;
retrieving from memory coupled to the computer system, in response to the selection of the category associated with the desired rule, a rule template associated with the selected category;
populating, based on the retrieved rule template:
one or more initial criteria in the rule body field defining one or more conditions for execution of the desired rule; and
one or more initial actions to be taken in conjunction with execution of the desired rule in the rule body field, in which the one or more initial criteria and one or more initial actions associated with the retrieved rule template are different from criteria and an actions associated with another rule template stored in the memory;
receiving, via the client computing device, one or more subsequent criteria and one or more subsequent actions associated with the desired rule;
generating, based on the criteria and actions associated with the desired rule, a data structure defining the desired rule; and
storing the data structure in the memory for subsequent retrieval and execution.

20. A method comprising:
presenting, by a computer system on a display screen of a client computing device in communication with the computer system, a graphical user interface (GUI) that includes: a rule identifier field, a rule category field, and a rule body field;
receiving, via the client computing device, input to the GUI that includes:
an identifier in the rule identifier field for a desired rule; and
a selection of a category associated with the desired rule in the rule category field;
retrieving from memory coupled to the computer system, in response to the selection of the category associated with the desired rule, a rule template associated with the selected category;
populating, by the computer system based on the retrieved rule template:
one or more initial criteria in the rule body field defining one or more conditions for execution of the desired rule; and
one or more initial actions to be taken in conjunction with execution of the desired rule in the rule body field, in which the one or more initial criteria and one or more initial actions associated with the retrieved rule template are different from criteria and an actions associated with another rule template stored in the memory;
receiving, by the computer system via the client computing device, one or more subsequent criteria and one or more subsequent actions associated with the desired rule;
generating, by the computer system based on the criteria and actions associated with the desired rule, a data structure defining the desired rule; and
storing, by the computer system, the data structure in the memory for subsequent retrieval and execution.

* * * * *